(12) United States Patent
Miyazawa et al.

(10) Patent No.: US 7,118,038 B2
(45) Date of Patent: Oct. 10, 2006

(54) CARD READER

(75) Inventors: Shinya Miyazawa, Nagano (JP); Kazutoshi Ishikawa, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 0 days.

(21) Appl. No.: 10/746,215

(22) Filed: Dec. 23, 2003

(65) Prior Publication Data

US 2004/0245336 A1 Dec. 9, 2004

(30) Foreign Application Priority Data

Dec. 25, 2002 (JP) .............................. 2002-373649
Nov. 26, 2003 (JP) .............................. 2003-394946

(51) Int. Cl.
*G06K 7/00* (2006.01)

(52) U.S. Cl. ....................................... 235/453; 235/379

(58) Field of Classification Search ................ 235/453, 235/380, 379, 375, 440, 441, 454

See application file for complete search history.

(56) References Cited

U.S. PATENT DOCUMENTS

| | | | | |
|---|---|---|---|---|
| 4,803,349 | A * | 2/1989 | Sugimoto et al. | 235/475 |
| 5,196,687 | A * | 3/1993 | Sugino et al. | 235/483 |
| 6,021,948 | A * | 2/2000 | Tsai et al. | 235/486 |
| 6,491,216 | B1 * | 12/2002 | May | 235/375 |
| 6,494,364 | B1 * | 12/2002 | Shepherd | 235/379 |
| 6,527,187 | B1 * | 3/2003 | Nagata et al. | 235/475 |
| 6,629,643 | B1 * | 10/2003 | Nagata et al. | 235/475 |
| 6,761,310 | B1 * | 7/2004 | May | 235/380 |
| 2004/0026507 | A1 * | 2/2004 | Nagata et al. | 235/449 |
| 2004/0035929 | A1 * | 2/2004 | Okada | 235/438 |

FOREIGN PATENT DOCUMENTS

JP 11-085916 3/1999

* cited by examiner

*Primary Examiner*—Steven S. Paik
(74) *Attorney, Agent, or Firm*—Reed Smith LLP

(57) ABSTRACT

A card reader which reads or writes data from or to a card inserted through a card insertion port into a card reader body via a card transport path is described the card reader comprises a shutter provided near the card insertion port to open or close the card transport path. A first detector is provided for detecting the card inserted therein near a first end of the card insertion port. A sensor is provided for detecting a change in the first detector. A locking member of the card reader is capable of switching positions of the shutter between an open-position and a close-and-lock position. A controller is provided for controlling switching positions of the locking member between the open position and the close-and-lock position of the shutter. A second detector is provided at a second end of the card insertion port, which is capable of switching states of the locking member between a stationary mode and a movable mode such that when the card is inserted into A card insertion port, the second detector sets the locking member in the movable mode and the controller starts up based on the sensor output to move the locking member to the open position of the shutter to allow the shutter to be opened or closed.

4 Claims, 5 Drawing Sheets

CARD READER

CROSS-REFERENCE TO RELATED APPLICATION

This application claims priority of Japanese Application No. 2002-373649 filed Dec. 25, 2002 and Japanese Application No. 2002-373649 filed Nov. 26, 2003, the complete disclosure of which are hereby incorporated by reference.

BACKGROUND OF THE INVENTION a) Field of the Invention

The present invention relates to a card reader which reads data on a magnetic card or a card similar to a magnetic card. More specifically, the present invention relates to a shutter mechanism for a card reader.

b) Description of the Related Art

There are two types of card readers, namely, motor type and manual type, and it has become essential that both types have a countermeasure for fraudulent insertion of a foreign material, except coins or bills.

Examples of such countermeasures include providing a card reader with a complete shutter provided at the card insertion port, a driving source such as a solenoid for opening or closing of the complete shutter, and a sensor for detecting insertion of a card into a card insertion port. In this card reader, a sensor detects a card being inserted, which actuates a solenoid, which in turn opens the complete shutter. When a card is not inserted, the complete shutter is closed to prevent the card insertion port from insertion of foreign material.

Alternately, a pre-head may be provided in place of the above sensor such that the pre-head can read data on a card to be inserted before insertion. In this type, the pre-head determines whether the card to be inserted is a valid card such that a solenoid is actuated only when a valid card is inserted: when an inserted object (foreign object) is not a valid card, the complete shutter closes to prevent the card insertion port from the foreign object.

Alternately, detection members may be provided at both ends of the card insertion port such that each of the detection members turns off or on a common photo-sensor in a card reader of this type. Each of the detection members is actuated upon insertion of a card, which is detected by a photo-sensor, followed by actuation of a solenoid to open the shutter.

Patent Publication 1: Japanese Laid-open Patent Application No. H11-85916 (See Japanese Patent Publication Official Gazette from page 6 (line 13 in the right column) to page 7 (line 6 in the left column)).

Problems the Invention Intends to Solve

In a card reader of the type in which a sensor detects a card, multiple sensors are required to enhance detection accuracy since a single sensor may erroneously detect a foreign object (e.g. bar) as a card. This increases the size and manufacturing cost of a card reader of this type.

In a card reader utilizing a pre-head, which usually is an expensive magnetic head, the pre-head must be arranged outside the shutter. This type also increases the size and manufacturing cost of a card reader of this type.

Further, in the card reader of the type in which detection members are provided at both ends of a card insertion port, a long arm must stretch from both ends of the card insertion port to a photo sensor, which also increases the size of the card reader.

OBJECT AND SUMMARY OF THE INVENTION

Considering the above problems, the primary object of the present invention is to provide a card reader having a shutter mechanism which does not require an increase in size or manufacturing costs.

To overcome the above problems, the present invention provides a card reader which reads or writes data from or to a card inserted from a card insertion port into a card reader body via a card transport path wherein the card reader comprises: a shutter provided near the card insertion port to open or close the card transport path; a first detector for detecting the card inserted therein near a first end of the card insertion port; a sensor for detecting a change in the first detector; a locking member being capable of switching positions of the shutter between an open-position and a close-and-lock position; a controller for controlling switching positions of the locking member between the open position and the close-and-lock position of the shutter; and a second detector, provided at a second end of the card insertion port, being capable of switching states of the locking member between a stationary mode and a movable mode such that when the card is inserted into the card insertion port, the second detector sets the locking member in the movable mode and the controller starts up based on the sensor output to position the locking member to the open position to allow the shutter to be opened or closed.

The present invention has a second detector (sensor) that locks the locking member itself, which is an additional function of a sensor and locking member of conventional technology. This enhances error-free detection of card insertion, thereby enhancing reliability. Moreover, the second sensor has a simple structure, which does not increase the size and cost of manufacturing the card reader. In this specification, "card insertion port" includes the slot through which a card is inserted and the area of the card transport path from the slot portion to the shutter.

In the present invention, the locking member of the present invention is locked to be in a stationary mode. As a result, the structure of the second detector can simple to avoid an increase in size and manufacturing cost thereof.

Further in the present invention, the second detector is a lever member having a contact portion that touches the card at the second end of the slot wherein the contact portion rotates around the supporting shaft such that it can pop in and out at the second end of the slot.

Further in the present invention, it is desirable that the tangent line at the contact portion of an imaginary circle is parallel to the width direction of the card in the card insertion port. In this way, the friction between the card and the contact portion can be minimized during card insertion and ejection. Jamming of a card during insertion and ejection can also be prevented.

Advantageous Effects of the Invention

The present invention has a second detector that locks the locking member itself, which is an additional function of a sensor and a locking member of conventional technology. This delineates error-free detection of card insertion to enhance reliability thereof. Moreover, the second sensor, which is only an addition to the sensor and the locking member, is of a simple structure, which does not require an increase in size and manufacturing costs of the card reader.

The present invention is described herein with reference to the drawings.

DESCRIPTION OF THE PREFERRED EMBODIMENTS

Embodiment 1

Figure 1:
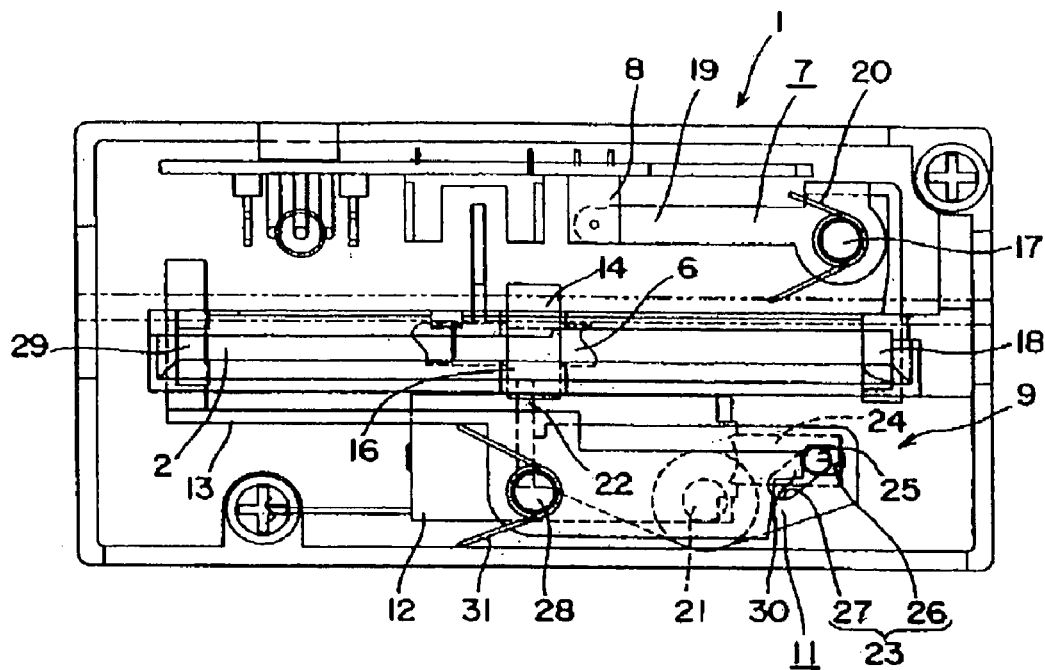
FIG. 1 is a plan view of the card reader of Embodiment 1 of the present invention, before a card is inserted therein.

FIGS. 1–6 illustrate a card reader 1 associated with Embodiment 1 of the present invention. Card reader 1 reads out and writes data on card 5 inserted from card insertion port 2 into card reader body 4 via card transfer path 3. Card reader 1 comprises: a shutter 6 provided near the card insertion port 2 to open or close card transport path 3; a first detector 7 for detecting card 5 inserted therein near a first end of the card insertion port 2; a sensor 8 for detecting a change in the first detector 7; a locking member 11 being capable of switching positions of shutter 6 between an open position 10 and a close-and lock position 9; a controller 12 for controlling switching positions of locking member 11 between an open position 10 and a close-and-lock position 9 of shutter 6; and a second detector 13, provided at a second end of card insertion port 2, being capable of switching states of locking member 11 between a stationary mode and a movable mode for locking member 11 such that when card 5 is inserted into card insertion port 2, second detector 13 sets locking member 11 in the movable mode and controller 12 starts up based on the sensor output to position the locking member 11 at the shutter-open position 10 to allow shutter 6 to be opened or closed.

Figure 2:
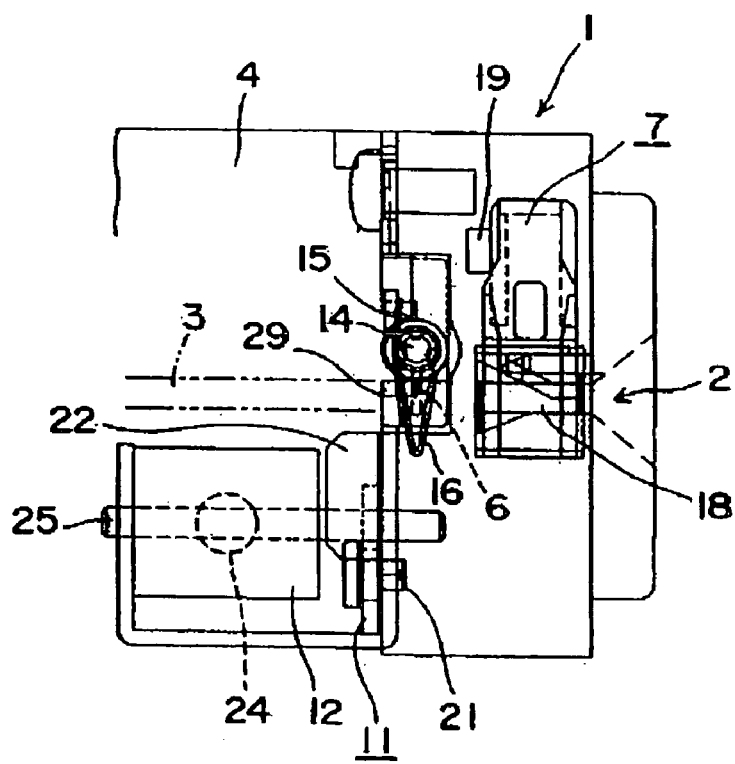
FIG. 2 is a side view of the card reader of Embodiment 1 of the present invention, before a card is inserted therein.

Shutter 6 is, as illustrated in FIG. 2, is arranged slightly more inward toward machine body 4 than card insertion port 2. Shutter 6 or complete shutter 6, which completely closes card transport path 3, is integrally formed with rotary shaft 15, which is engaged with the bearing portion of the body above card transport path 3. The number of components required for manufacturing card reader 1 of Embodiment 1 is thus minimized. Recoil spring 15 made of a torsion coil spring is provided on rotary shaft 14 to return shutter 6 (to its original position). Each arm portion of recoil spring 15 is hooked up to shutter 6 and the body frame respectively.

Shutter 6 is always pressed to be in the closed state: shutter 6 is normally closed by elastic force of recoil spring 15; however, it can be opened when one pushes up shutter 6 against the force from recoil spring 15. Engagement portion 16 is provided in the center of shutter 6 wherein engagement portion 16 projects under card transport path 3 and is available to be mated with locking member 11.

First detector 7 is constructed with an arm member, which rotates around supporting shaft 17. First detector 7 comprises: a contacting portion 18, which can be available at first end of card insertion port 2; and a portion to be detected 19, which rocks to turn sensor 8 on or off. In addition, spring 20 is a torsion coil spring for transmitting force in the direction in which contacting portion 18 is pushed out to card insertion portion 2.

Sensor 8 is made of a photo-interrupter. The portion to be detected 19 of first detector 7 detects (determines) whether sensor 8 should be shielded. In this embodiment, when card 5 is not inserted into card insertion port 2, contacting portion 18 of first detector 7 pops out in card insertion port 2 and the portion to be detected 19 turns on sensor 8 by shielding. When card 5 is inserted into card insertion port 2, contacting portion 18 of first detector 7 is pushed out of card insertion port 2 and the portion to be detected 19 turns off sensor 8 by not shielding.

Locking member 11 is made of a lever member, which rotates around supporting shaft 21. Locking member 11 comprises: a locking member 22, which is engaged with engagement portion 16 of shutter 6 and is capable of locking shutter 6 in the closed state; and coupling portion 23, which is a through hole to be engaged with controller 12.

Controller 12 is a solenoid or the like. Output shaft 24 of controller 12 is coupled with coupling portion 23 by means of coupling pin 25 which is inserted throughout coupling portion 23 in the card transport direction. Controller 12 allows output shaft 24 to pop out when sensor 8 is turned on, it removes output shaft 24 when sensor 8 is turned off. Note that controller 12 may be a motor or the like, instead of a solenoid.

Figure 3:
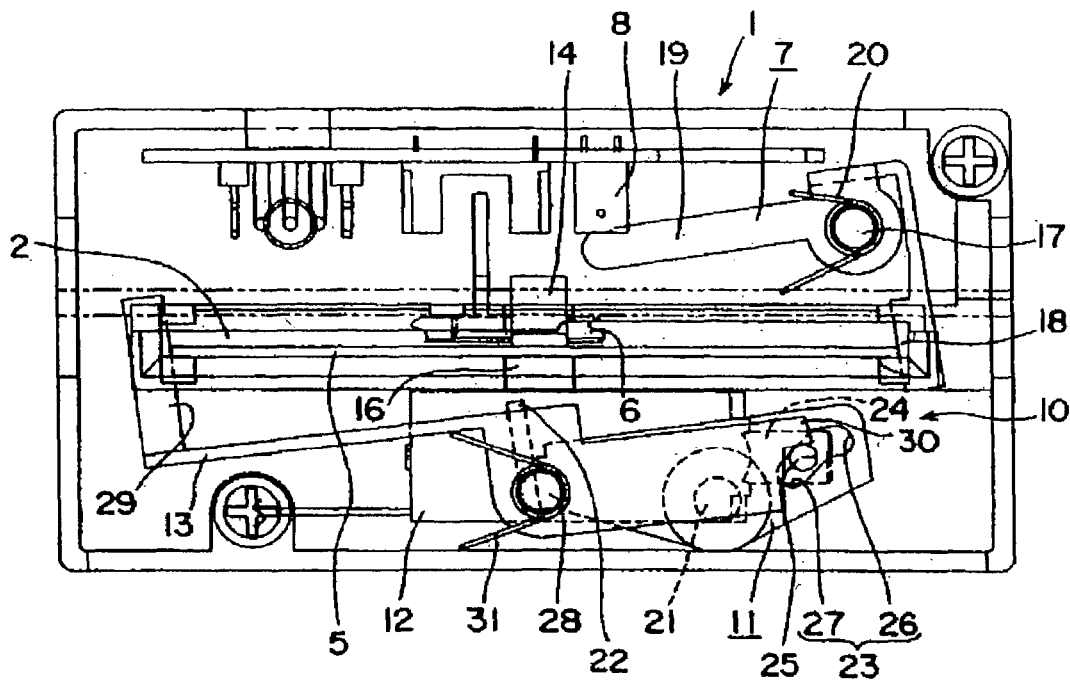
FIG. 3 is a plan view of the card reader of Embodiment 1 of the present invention, when a card is inserted therein.

Locking member 11 rotates around coupling pin 25, which utilizes coupling portion 23 as a cam channel. Coupling portion 23 has a stationary portion 26 and an open portion 27: when output shaft 24 pops out, locking portion 22 is mated with engagement portion 16 of shutter 6 with the assistance of stationary portion 26; when output shaft 24 is removed therefrom, locking member 11 rotates toward an open portion 27 to remove locking portion 22 from engagement portion 16 of shutter 6. As output shaft 24 pops out, coupling pin 25 is at stationary position 26; locking member 11 is at close-and-lock position 9, in which locking portion 22 of locking member 11 is mated with engagement portion 16 of shutter 6 (FIG. 1); when output shaft 24 retracts, coupling pin 25 is at open portion 27, which locates locking member 11 at open position 10 of shutter 6 where locking portion 22 is removed from engagement portion 16 (FIG. 3).

On the other hand, second detector 13 mechanically locks locking member 11 in the stationary state. In this embodiment, second detector 13 is constructed with a lever member, which rotates around (rotation) supporting shaft 28. Supporting shaft 28 is provided in the center portion of card reader 1 parallel to coupling pin 25. Second detector 13 comprises: a contacting portion 29, which can be present or absent at the second end of card insertion port 2; and a restricting portion 30, which can restrict coupling pin 25 in such a manner that coupling pin 25 is positioned at stationary portion 26. In addition, spring 31 is a torsion coil spring for transmitting force in the direction, in which contacting portion 29 is pushed out to card insertion portion 2. When card 5 is not inserted into card insertion port 2, contacting portion 29 of second detector 13 pops out in card insertion port 2 and restriction portion 30 positions coupling pin 25 at stationary portion 26. Locking member 11 thus enters the stationary state. When card 5 is inserted into card insertion port 2, contacting portion 29 of second detector 13 is pushed out from card insertion port 2 and regulating portion 30 releases coupling pin 25. Locking member 11 thus enters a movable state.

Operation of card reader 1 is described below.

When card 5 is not inserted into card insertion port 2, as illustrated in FIGS. 1 and 2, first detector 7 allows spring 20 to push contact portion 18 into card insertion port 2 to sense the portion to be detected 19 to turn on sensor 8, thereby pushing out output shaft 24 of controller 12. In other words, as long as output shaft 24 of controller 12 pops out and locking member 11 is at close-and-lock position 9, shutter 6 is locked in the closed position. Second detector 13 lets contact portion 29 pop into card insertion port 2 via spring 31 and restricting portion 30 restricts locking member 11 to maintain its stationary state. In the stationary state, pushing shutter 6 with a foreign object such as coin or wire does not open shutter 6.

Figure 4:
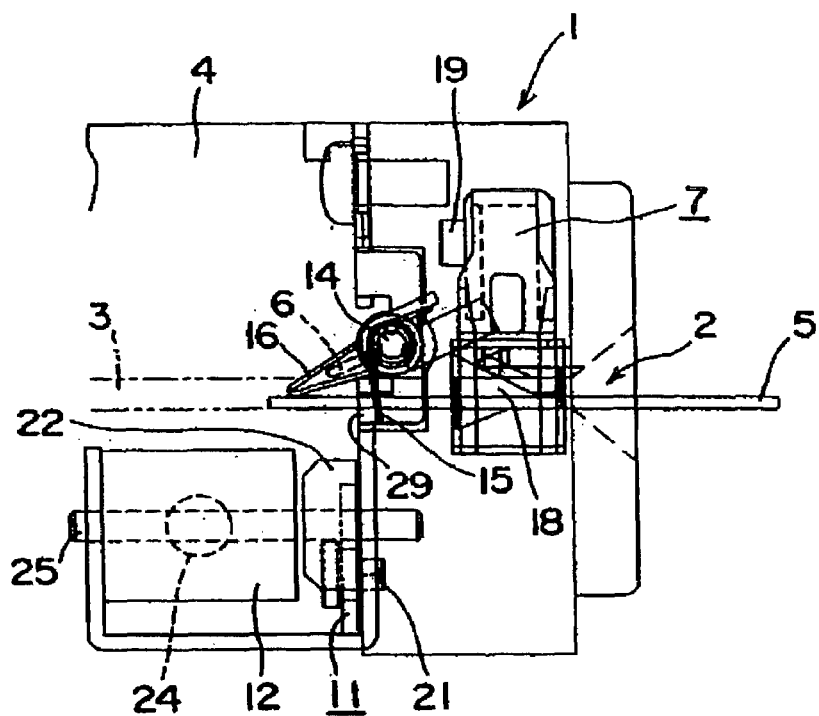
FIG. 4 is a side view of the card reader of Embodiment 1 of the present invention, when a card is inserted therein.

When card 5 is inserted into card insertion port 2, card 5 touches contact portions 18 and 29, as illustrated in FIGS. 3 and 4; first detector 7 and second detector 13 are together pushed out of card insertion port 2 at the same time. Second detector 13 removes restriction portion 30 from coupling pin 25 to switch locking member 11 to a movable state. First sensor 7 turns off sensor 8. At this time, as restriction portion 30 of second detector is removed from coupling pin 25, output shaft 24 is taken therein without any interruption. Locking member 11 is thus switched to open position 10 such that shutter 6 can be opened or closed. Card 5 reaches shutter 6, when card 5 pushes shutter 6 to open it.

On the other hand, as inserted card 5 is pulled out of shutter 6, shutter 6 is closed by recoil spring 20. As card 5 is further pulled out until it is removed from card insertion port 2, first detector 7 is returned (to its initial position) via recoil spring 20, when sensor 8 is turned on; controller 12 lets output shaft 24 pop out to move locking member 11 to close-and-lock position 9, thereby locking shutter 6 therein. As second detector 13 is returned (to its original position), restricting portion 30 restricts locking member 11 to maintain a stationary state.

Figure 5:
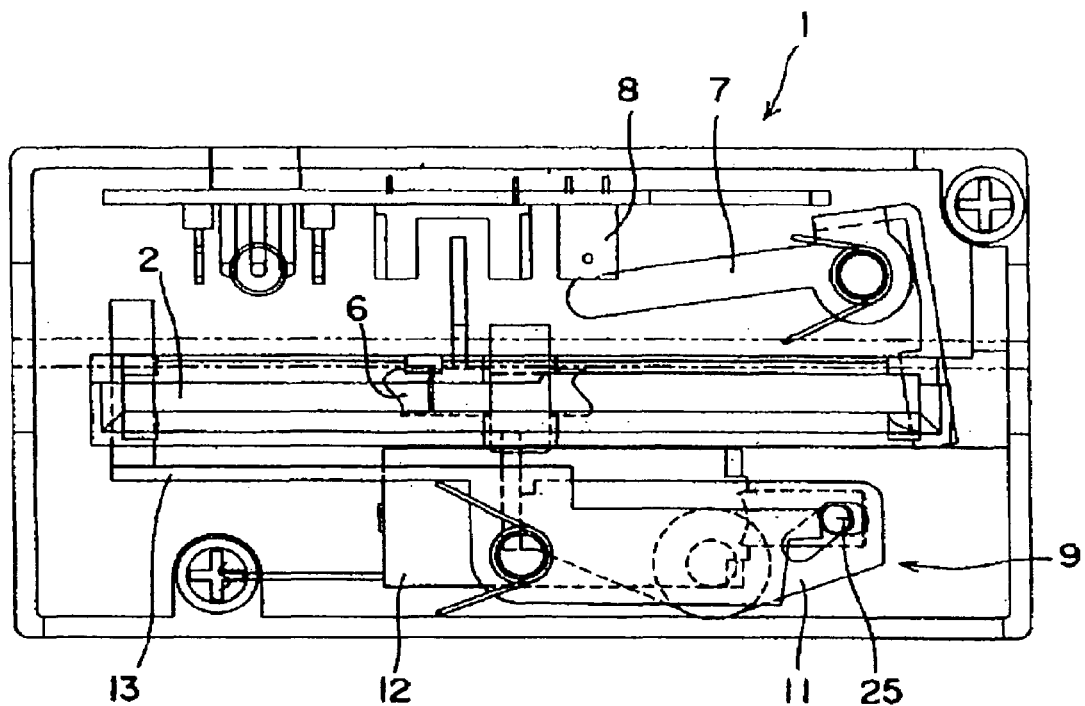
FIG. 5 is a plan view of the card reader of Embodiment 1 of the present invention, in which only the first detector is activated.

Now, assume that shutter 6 is in a closed state and a foreign object is inserted and pushes first detector 7 only; sensor 8 is turned off, as illustrated in FIG. 5. Controller 12 tries to pull in output shaft 24 but second detector 13 regulates coupling pin 25 to maintain locking member 11 in a stationary state. Shutter 6 is thus kept in a closed state. This prevents not only insertion of a foreign object but also sequential insertion of two cards.

Figure 6:
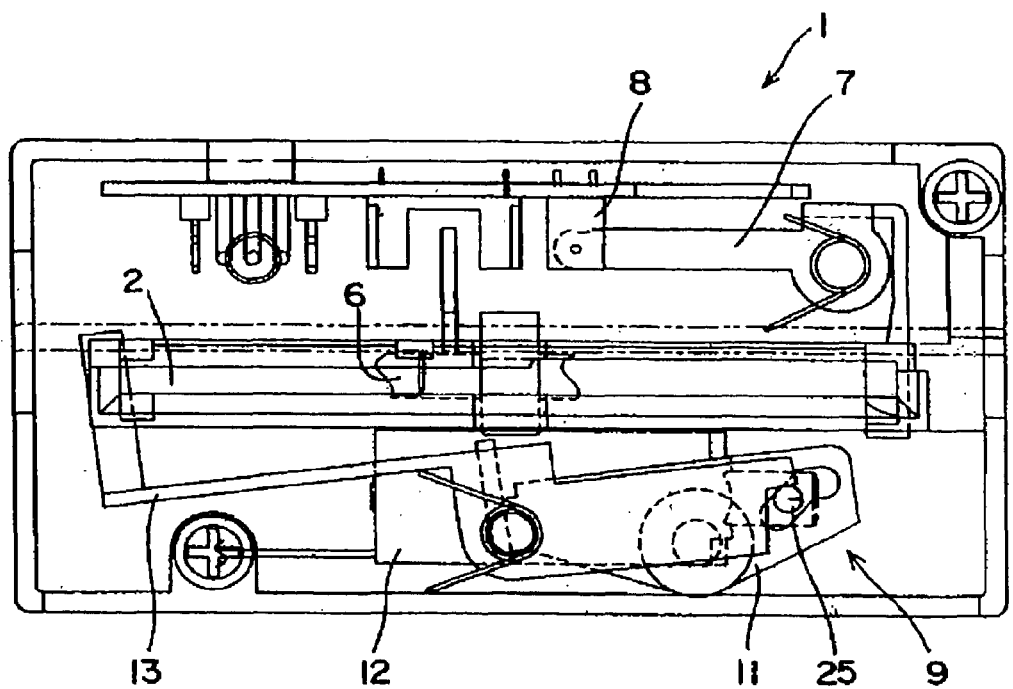
FIG. 6 is a plan view of the card reader of Embodiment 1 of the present invention, in which only the second detector is activated.

When a foreign object is inserted to push only second detector 13 while shutter 6 is in a closed state, as illustrated in FIG. 6, locking member 11 is not regulated. Sensor 8 does not detect (portion to be detected 19), as a result, controller 12 does not start up. Shutter 6 is thus locked in a shutter-close state. This prevents not only insertion of a foreign object but also continual insertion of two cards.

Embodiment 2

Figure 7:
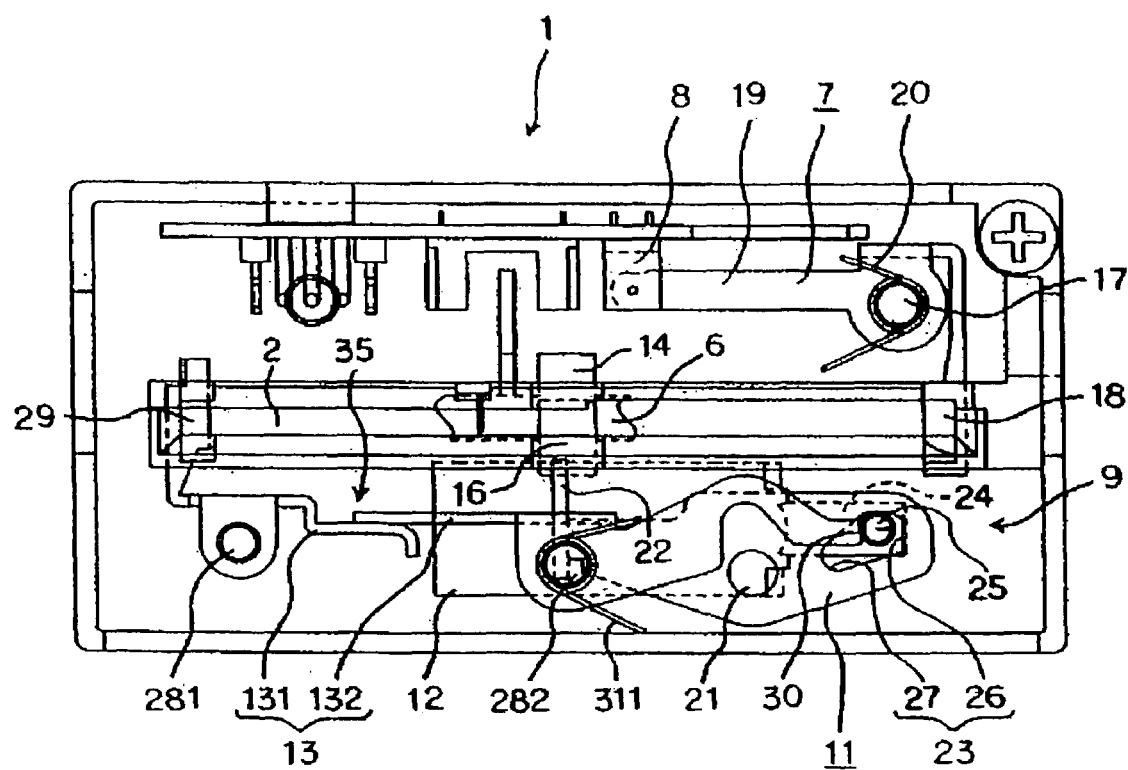
FIG. 7 is a plan view of the card reader of Embodiment 2 of the present invention, before a card is inserted therein.
Figure 8:
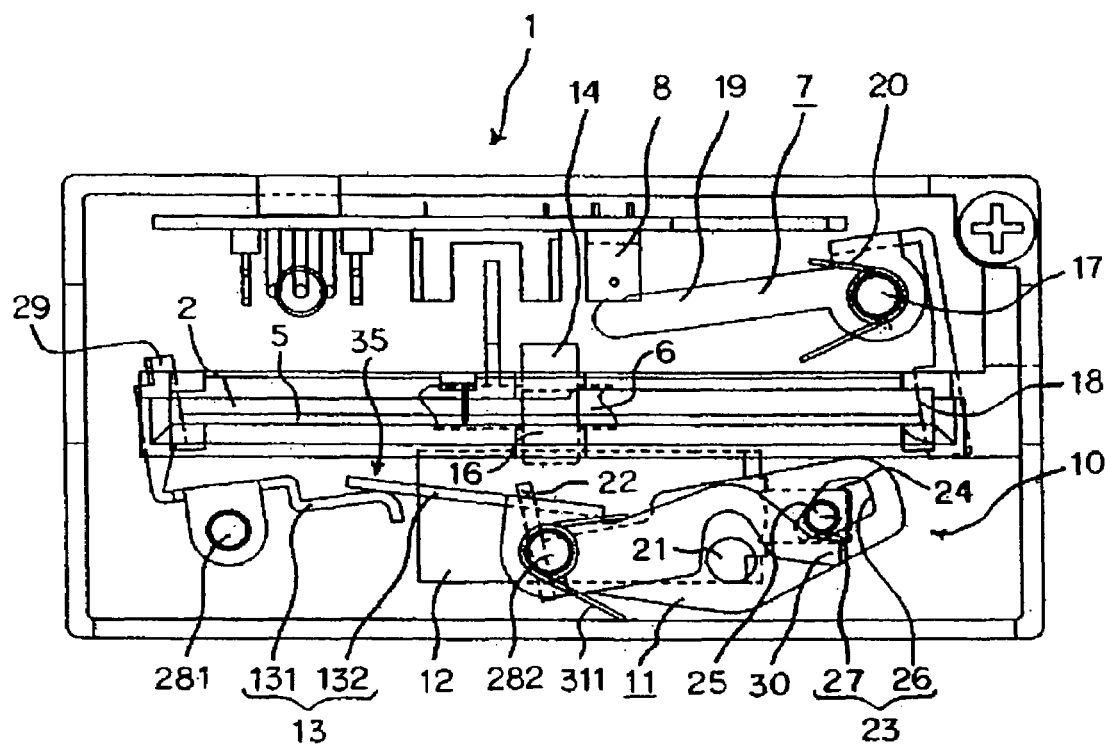
FIG. 8 is a plan view of the card reader of Embodiment 2 of the present invention, when a card is inserted therein.

FIGS. 7 and 8 illustrate the card reader of Embodiment 2. This card reader shares a common basic configuration with that of Embodiment 1; therefore, common components are given the same reference symbols in the drawings without further description. Operations of components that are common to Embodiment 1 are also eliminated.

The card reader of Embodiment 2 is different from that of Embodiment 1 in that second detector 13 is constructed with two lever members. Second detector comprises: a first lever member 131, which rotates around supporting shaft 281; and a second lever member 132, which rotates around supporting shaft 282. Contact portion 29 is provided on the first end of first lever member 131 and restriction portion 30 is provided at the first end of second lever member 132. The second end of first lever member 131 and the second end of second lever member 132 contact each other in such a manner that the second end of second lever member 132 lies on top of the second end of first lever member 131.

Supporting shaft 281 is provided immediately below contacting portion 29 in a projecting state in which contacting portion 29 pops out into card insertion portion 2. In other words, supporting shaft 281 is provided in such a manner that an imaginary circle at the contact portion is parallel to the width direction of card 5 in the card insertion port 2.

In addition, supporting shaft 282 is provided in such a manner that it is located in the center of card reader 1 parallel to coupling pin 25.

Spring 311, a torsion coil spring, is attached to supporting shaft 282. Second lever member 132 is pushed by spring 311 counterclockwise around supporting shaft 282, as illustrated in FIGS. 7 and 8. First lever member 131, at contact portion 35, is pushed by spring 311 clockwise around supporting shaft 281 as illustrated therein. First lever member 131 is pushed in a direction in which contact portion 29 projects toward card insertion port 2; contact portion 29 rotates around supporting shaft 281 such that it pops in and out at the second end of card insertion port 2.

In card reader 1 of the above embodiments, when card 5 is not inserted into card insertion port 2, contact portion 29 provided on first lever member 131 is pushed out by spring 311 in card insertion port 2 while restriction portion 30 provided at second lever member 132 brings coupling pin 25 to stationary portion 26, putting locking member 11 in a stationary state. In contrast, when card 5 is inserted into card insertion port 2, contact portion 29 provided at first lever member 131 is pushed out of card insertion port 2 and first lever member 131 rotates around supporting shaft 281 counterclockwise, as illustrated in FIG. 8. Second lever 132, thus, rotates around supporting shaft 282 via contact portion 35, thereby releasing restriction of coupling pin 25. Locking member 11 thus enters a movable state.

In card reader 1 according to embodiment 2, second detector 13 is constructed with first lever member 131 and second member 132. The tangent line of an imaginary circle around supporting shaft 281 at the contact portion 29 is parallel to the width direction of the card in the card insertion port. Unlike card reader 1 of Embodiment 1, where supporting shaft 28, which is the center of rotation of contacting portion 29 (second detector 13), is positioned south east of contact portion 29 in the figure and the slope of the tangent line of an imaginary circle around supporting shaft 28 at contact portion 29, points north east, card reader 1 of this Embodiment 2 minimizes the friction between card 5 and contact portion 29 during discharge. Card reader 1 of Embodiment 2 thus prevents card 5 from jamming during insertion and ejection.

Embodiments described above are desirable modes; however, the present invention is not limited to these. A variety of modifications can be made as long as the spirit of the present invention remains the same. For example, locking member 11 is mechanically locked by second detector 13. Any alternative locking means may be applied for locking thereof.

Sensor 8 is the photo-interrupting type in the above embodiments. However, a micro switch may be utilized instead. First detector 7 and sensor 8 are separate members in the above embodiments. The present invention is not limited to this configuration. A photo-interrupter provided in card transport path 3 may provide both functions of detector 7 and sensor 8.

Shutter 6 is a complete shutter which covers the entire area of card transport path 3 in the above embodiments. Alternately, a shutter of the type that covers a part of card transport path 3 may be adopted.

While the foregoing description and drawings represent the present invention, it will be obvious to those skilled in the art that various changes may be made therein without departing from the true spirit and scope of the present invention.

What is claimed is:

1. A card reader which reads or writes data from or to a card inserted through a card insertion port into a card reader body via a card transport path wherein the card reader comprises:
    a shutter provided near the card insertion port to open or close the card transport path;
    a first detector for detecting one of both side end portions in a card width direction of the card inserted therein at a first end of the card insertion port in the card width direction;
    a sensor for detecting a change in the first detector;
    a locking member being capable of switching positions of the shutter between an open-position and a close-and-lock position;
    a controller for controlling switching positions of the locking member between the open position and the close-and-lock position of the shutter; and
    a second detector, which is provided at a second end which is opposite to the first end in the card width direction of the card insertion port for detecting the other of the both side ends of the card in the card width direction of the card inserted therein and for switching states of the locking member between a stationary mode and a movable mode such that when the card is inserted into the card insertion port, the second detector sets the locking member in the movable mode and the controller starts up based on the sensor output to move the locking member to the open position of the shutter to allow the shutter to be opened or closed,
    wherein the first detector detects one of both side end portions of the card at the first end of the card insertion port and the controller moves the locking member based on the sensor output due to the detection of the first detector such that the shutter is allowed to be opened when the second detector sets the locking member to the movable mode.

2. The card reader as set forth in claim 1 wherein the locking member is locked in the stationary mode.

3. The card reader as set forth in claim 2 wherein the second detector is a lever member having a contact portion that touches the card at the second end of the card insertion port wherein the contact portion rotates around a supporting shaft such that said contact portion can pop in and out at the second end of the card insertion port.

4. The card reader as set forth in claim 3 wherein the tangent line at the contact portion of an imaginary circle around said supporting shaft is parallel to the width direction of the card in the card insertion port.

* * * * *